United States Patent
Harjula et al.

(10) Patent No.: US 7,332,089 B2
(45) Date of Patent: Feb. 19, 2008

(54) METHOD OF EXTRACTING METAL IONS FROM AN AQUEOUS SOLUTION UTILIZING AN ANTIMONY SILICATE SORBENT

(75) Inventors: Risto Olavi Harjula, Espoo (FI); Johanna Teresia Moller, Espoo (FI); Suheel Amin, Lancashire (GB); Alan Dyer, Manchester (GB); Martyn Pillinger, Bristol (GB); Jonathan Andrew Newton, Cheshire (GB); Esko Heikki Tusa, Kauiainen (FI); Maurice Webb, Chester (GB)

(73) Assignee: INEOS Silicas Ltd., Warrington (GB)

( * ) Notice: Subject to any disclaimer, the term of this patent is extended or adjusted under 35 U.S.C. 154(b) by 131 days.

(21) Appl. No.: 10/675,138

(22) Filed: Sep. 30, 2003

(65) Prior Publication Data

US 2004/0065620 A1    Apr. 8, 2004

Related U.S. Application Data

(62) Division of application No. 09/674,596, filed as application No. PCT/GB99/01305 on May 13, 1999, now abandoned.

(30) Foreign Application Priority Data

May 14, 1998  (GB) ................................. 9810268.4
Feb. 24, 1999  (GB) ................................. 9904169.1

(51) Int. Cl.
*C02F 1/42*  (2006.01)
*B01D 15/04*  (2006.01)

(52) U.S. Cl. ........................ 210/681; 210/682; 210/688

(58) Field of Classification Search ................ 210/681, 210/682, 688; 423/2, 6, 49, 100, 139
See application file for complete search history.

(56) References Cited

U.S. PATENT DOCUMENTS 4,717,769 A    1/1988  Sato et al. ................... 540/536
5,166,443 A    11/1992 Merger et al. .............. 564/473

(Continued)

FOREIGN PATENT DOCUMENTS

JP   06106055   4/1994
JP   07185322   7/1995
SU   929209     5/1982

OTHER PUBLICATIONS

"Strontium binding properties of inorganic absorbents" J. Radioanal. Nucl. Chem. (1996), 204 (1), 75-82, 1996, XP002114174.

(Continued)

*Primary Examiner*—Duane Smith
(74) *Attorney, Agent, or Firm*—Reising, Ethington, Barnes, Kisselle, P C

(57) ABSTRACT

The invention provides a use of a material comprising antimony silicate as a sorbent in the removal of metal ions, e.g. radioactive metal ions, from an acidic liquid medium. The metal ions may be selectively removed from amongst other ions such as Na, K, Mg, and Ca ions. Strontium is particularly effectively removable in this way. There is also provided a method of preparing an antimony silicate material for use in removing metal ions. The invention further provides a material comprising antimony silicate doped with one or more elements selected from the group consisting of tungsten, niobium and tantalum. The doped material has been found to be particularly effective as a sorbent in the removal of metal ions from a liquid medium.

12 Claims, 11 Drawing Sheets

The powder XRD trace of amorphous Antimony Silicate

U.S. PATENT DOCUMENTS

| | | | |
|---|---|---|---|
| 5,677,254 A | | 10/1997 | Nojima et al. ................. 502/65 |
| 5,858,243 A | * | 1/1999 | Bedard ....................... 210/682 |
| 5,888,398 A | * | 3/1999 | Dietz et al. ................. 210/634 |
| 6,030,704 A | | 2/2000 | Wilshaw et al. ............ 428/404 |
| 6,110,378 A | * | 8/2000 | Anthony et al. ............ 210/682 |

OTHER PUBLICATIONS

Database WPI, Sectioin Ch, Weeek 8313, Derwent Publications Ltd., London, GB; Class J01, AN 83-31420K, XP002114175, no date.

* cited by examiner

The effect of $Ca^{2+}$ on $K_D$ (Sr-85)
(equilibrated samples)

The effect of $Mg^{2+}$ on $K_D$ (Sr-85)
(equilibrated samples)

The effect of $K^+$ on $K_D$ (Sr-85)
(equilibrated samples)

The effect of $K^+$ on $K_D$ (Sr-85)
(equilibrated samples)

The effect of Na+ on $K_D$(Sr-85) (equilibrated samples)

The effect of Na+ on $K_D$(Sr-85) (equilibrated samples)

$K_D$ (Sr-85) in 0.1 M $NaNO_3$ for antimonysilicate prepared at various synthesis temperatures
— Antimonysilicate acid added before silicate
— Antimonysilicate $K_D$ (Co-57) in 0.1 M $NaNO_3$ for antimonysilicate prepared at various synthesis temperatures
— Antimonysilicate acid added before silicate
— Antimonysilicate $K_D$(Sr-85) in 0.1 M $HNO_3$ for antimonysilicate prepared at various synthesis temperatures $K_D$(Co-57) in 0.1 M $HNO_3$ for antimonysilicate prepared at various synthesis temperatures $K_D$(Sr-85) in 0.1 M $HNO_3$ for antimonysilicate materials with varying Sb:Si ratios prepared at various synthesis temperatures $K_D$(Co-57) in 0.1 M $HNO_3$ for antimonysilicate materials with varying Sb:Si ratios prepared at various synthesis temperatures

METHOD OF EXTRACTING METAL IONS FROM AN AQUEOUS SOLUTION UTILIZING AN ANTIMONY SILICATE SORBENT

CROSS REFERENCE TO RELATED APPLICATIONS

This application is a divisional of U.S. Ser. No. 09/674,596 filed Feb. 27, 2001, now abandoned; which was an application under 35 U.S.C. 371 based on PCT application number PCT/GB99/01305, filed May 13, 1999 hereby incorporated by reference.

FIELD OF THE INVENTION

The present invention relates to the removal of metal ions from a solution phase. As an example, it may be used in the removal of radionuclides from a solution, but it should be understood that the invention is not restricted in any way to radionuclides.

BACKGROUND OF THE INVENTION

In the nuclear industry large volumes of aqueous streams are produced which contain radionuclides and other polluting metal species. It is desirable to dispose of such wastes with minimum volume for maximized capacity usage. Actinide elements, fission products, activation products and heavy metals typically are removed from such wastes. Techniques such as flocculation or ion exchange have been employed to remove these species and have been generally successful. However, certain radionuclides can be more problematic to remove than others. For example, strontium ions are difficult to remove by known ion exchange techniques when present in acidic media. Moreover, other ions present in the solution, eg $Ca^{2+}$, $Mg^{2+}$, $Na^+$, $K^+$, may interfere with the uptake of strontium. Commercially available materials for Sr removal includes clinoptilolite (a zeolite mineral), sodium titanates (Allied Signal, U.S.), titanosilicate CST (UPO, U.S.) and titanium-oxide based SrTreat (Selion OY, Finland) which work more efficiently in neutral/alkaline media.

STATEMENT OF THE INVENTION

Figure 1:
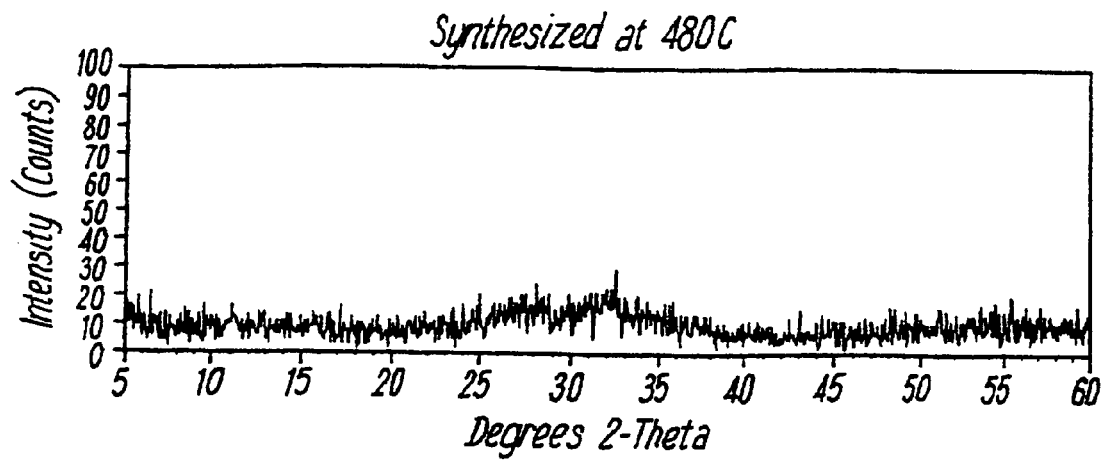
FIG. 1 is a powder x-ray defraction trace of amorphous antimony silicate of the present invention.

According to a first aspect of the present invention, there is provided a use of a material comprising antimony silicate as a sorbent in the removal of metal ions from an acidic liquid medium.

The metal ions may be radioactive metal ions.

The radioactive metal ions may comprise Sr, Cs, Co, Pu or Am ions.

The radioactive metal ions may be removed from an acidic liquid medium which contains background ions such as Na, K, Mg, and Ca ions at a higher concentration than the concentration of the radioactive metal ions.

The radioactive metal ions may be selectively removed from the acidic liquid medium which contains background ions such as Na, K, Mg, and Ca ions, the background ions being left behind in the liquid medium.

According to a second aspect of the present invention, there is provided a method of preparation of a material comprising antimony silicate, the method comprising reacting together in a liquid medium silicon containing compound and an antimony containing compound under polymerisation conditions, characterised in that the mole ratio of Si:Sb is less than about 20 and the reaction product is dried at a temperature from 40° C. to 800° C. to form the material.

Preferably, the reaction product is dried at a temperature from 40° C. to 300° C. More preferably, the product is dried at a temperature from 40° C. to 100° C.

According to a third aspect of the present invention there is provided a method of extracting metal ions from an aqueous solution comprising contacting the aqueous solution with a material comprising antimony silicate prepared by the method of the second aspect of the present invention.

The ions may be radioactive ions. The ions may be strontium ions. The aqueous solution may have a pH less than 7.

It has been found by the inventors that the material comprising antimony silicate is highly effective as an ion exchange material for selectively removing metal ions, e.g. Sr, Co, Pu and Am ions, from aqueous solutions.

The material is effective at selectively removing the metal ions Sr, Co, Pu and Am from a solution containing background metal ions such as Na, K, Mg and Ca whilst leaving behind the background ions in solution.

Antimony silicate has been found to be particulary effective at removing radioactive ions. The radioactive ions may comprise one or more of Sr, Cs, Co or Pu metal ions. Also toxic heavy metal ions may be removed.

The material has been found to be of comparable effectiveness to commercially available ion exchange materials for the removal of many ions and has been found to be much more effective than commercial materials for the removal of some ions in particular. The material is more efficient at removing Sr, Co, Pu and Am ions, for example, than many conventional ion exchanges. The material is very effective at removing Sr ions from aqueous solution.

The material has been found to be especially good at removing Sr ions from acidic media. In contrast, known ion exchangers are poor at removal of metal ions, in particular Sr, from acidic aqueous media.

$K_d$ values for several nuclides in various 'model' test media are shown in Table 1. $K_d$ is calculated according to equation 1.

$$K_d = (Ai - A) \cdot V / Ai \cdot m \qquad (1)$$

where Ai is the initial cation concentration, A is the cation concentration after contact with the ion exchanger, V is the volume of solution and m is the mass of the ion exchange material. $K_d$ is an estimation of the processing capacity of the material. $K_d$ is a measure of the distribution of the isotope between the solid and liquid phases.

Figure 2:
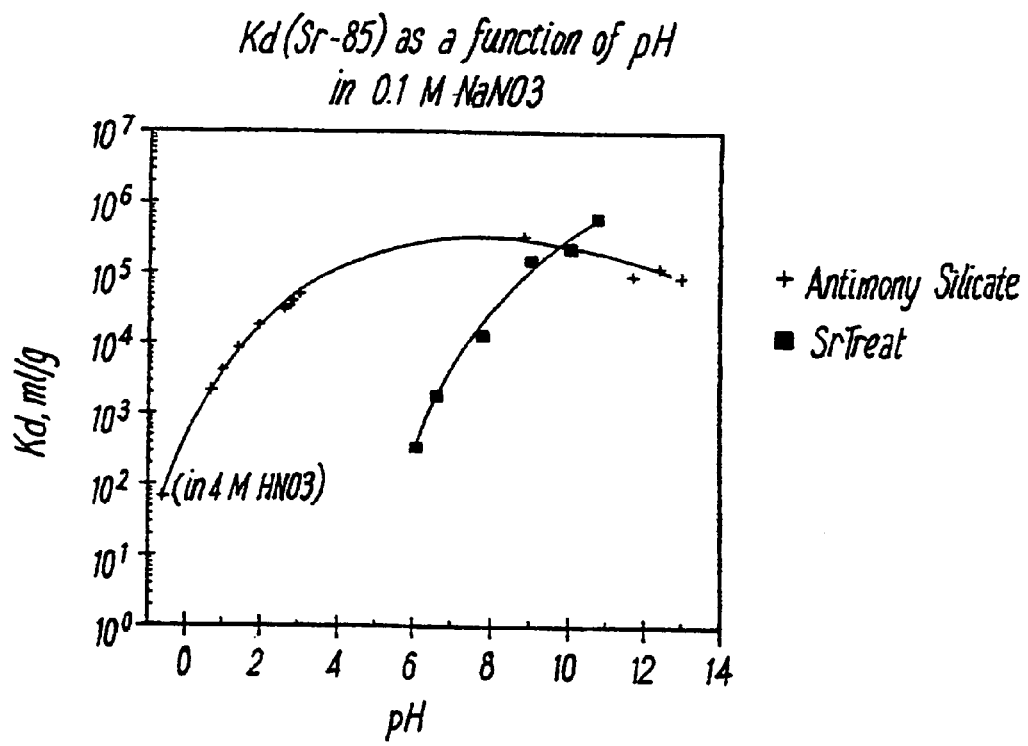
FIG. 2 is a plot of $K_d$(Sr-85) as a function of pH in 0.1 M $NaNO_3$ of the present invention.

The material is much more efficient for Sr uptake, for example, than commercial materials such as CST and clinoptilolite, see FIG. 2 and Tables 1, 2 and 3.

Figure 7A:
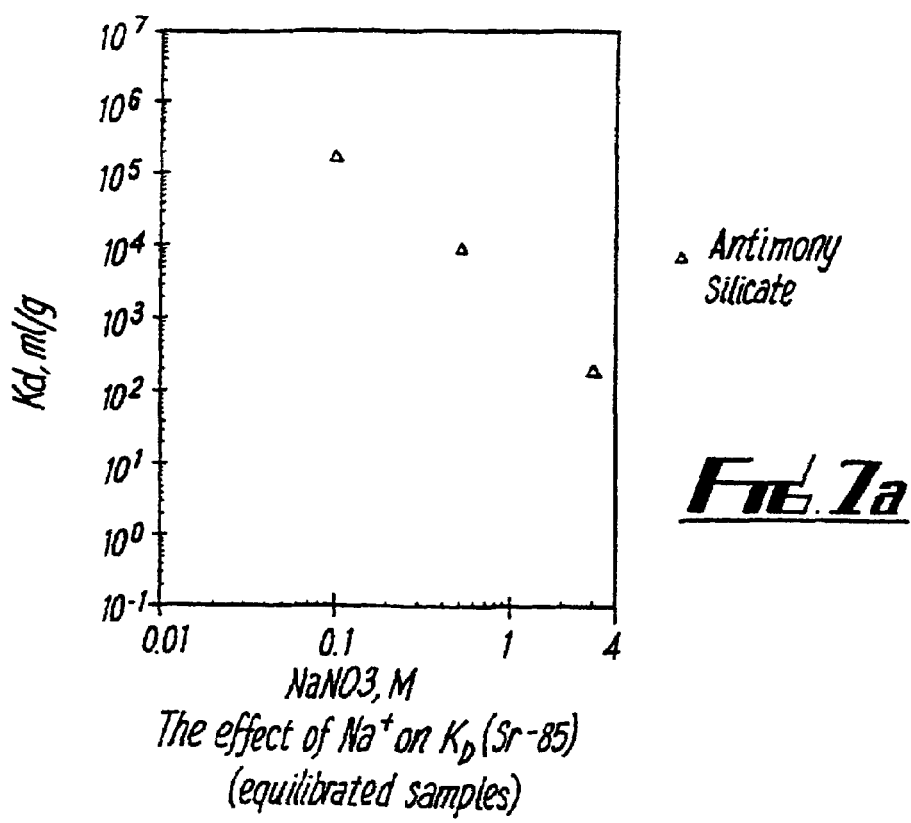
FIG. 7a is a plot showing the effect of $Na^+$ on $K_D$(Sr-85) of the present invention.
Figure 7B:
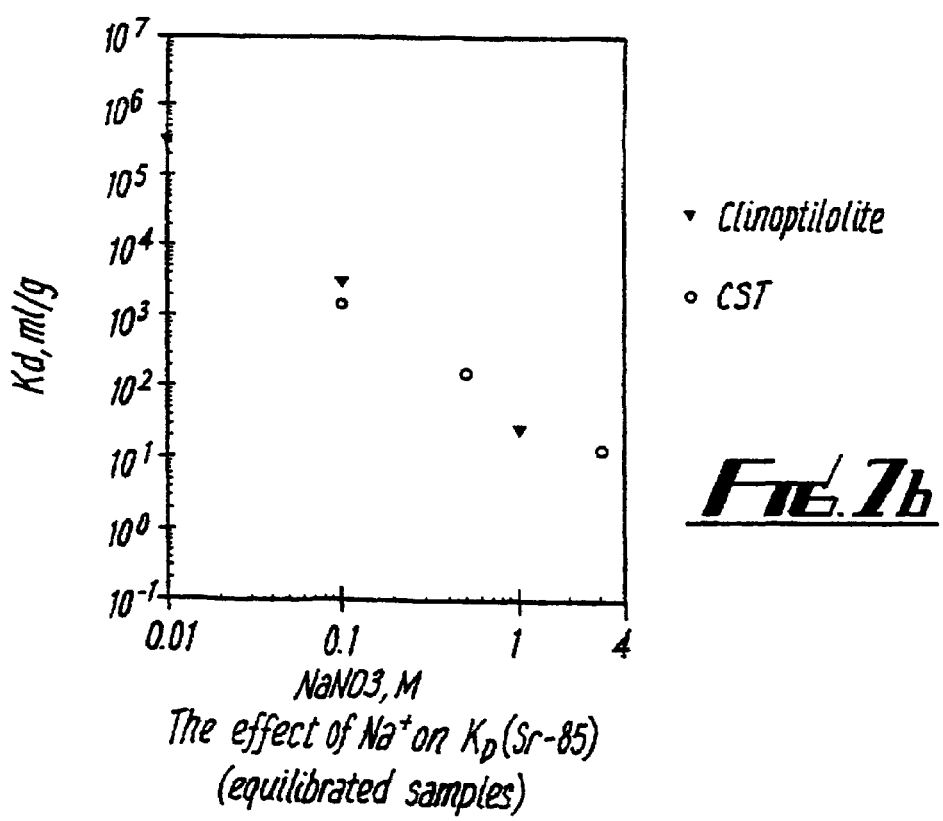
FIG. 7b is a plot showing the effect of $Na^+$ on $K_D$(Sr-85) of the present invention.

The material is also more efficient for Sr uptake than commercial materials in the presence of other cations such as $Na^+$ for example, see FIGS. 7a and 7b.

The material may be amorphous or crystalline but is preferably crystalline. Preferably, the X-ray Diffraction (XRD) pattern of the crystalline material shows characteristics of crystalline antimony silicate.

Referring to the method of preparation of the antimony silicate, the silicon and antimony containing compounds may be compounds which have been used previously such as in J. Solid State Chem., 99, 173 (1992) to synthesise antimony silicates. For example, the silicon containing compound may be $Si(OC_2H_5)_4$ (TEOS) or $Na_2Si_3O_7$ (sodium silicate) or another suitable starting material. The silicon containing compounds may be provided dissolved in a suitable solvent such as water or ethanol for example. The antimony containing compound may, for example, be $KSb(OH)_6$ or $SbCl_5$. The antimony containing compound may be dissolved in water or other suitable solvent. Preferably the antimony containing compound comprises Sb(V) rather than Sb(III).

The Si:Sb mole ratio is less than about 20. Preferably the Si:Sb mole ratio is less than 5. More preferably, the Si:Sb ratio is in the range from 3:1 to 1:3. Most preferably the Si:Sb ratio is from 1:1 to 1:2.

The reaction product may be dried for a period of time of, e.g., several days. The reaction product may be dried for an overnight period. The reaction product is dried at a temperature from slightly above ambient temperature to about 800° C. Particularly, the drying temperature is from 40° C. to 800° C. Preferably, the drying temperature is from 40° C. to 300° C. More preferably, the drying temperature is from 40° C. to 100° C. Typically, the reaction product may be dried for an overnight period at a temperature from about 40° C. to about 70° C.

Figure 8A:
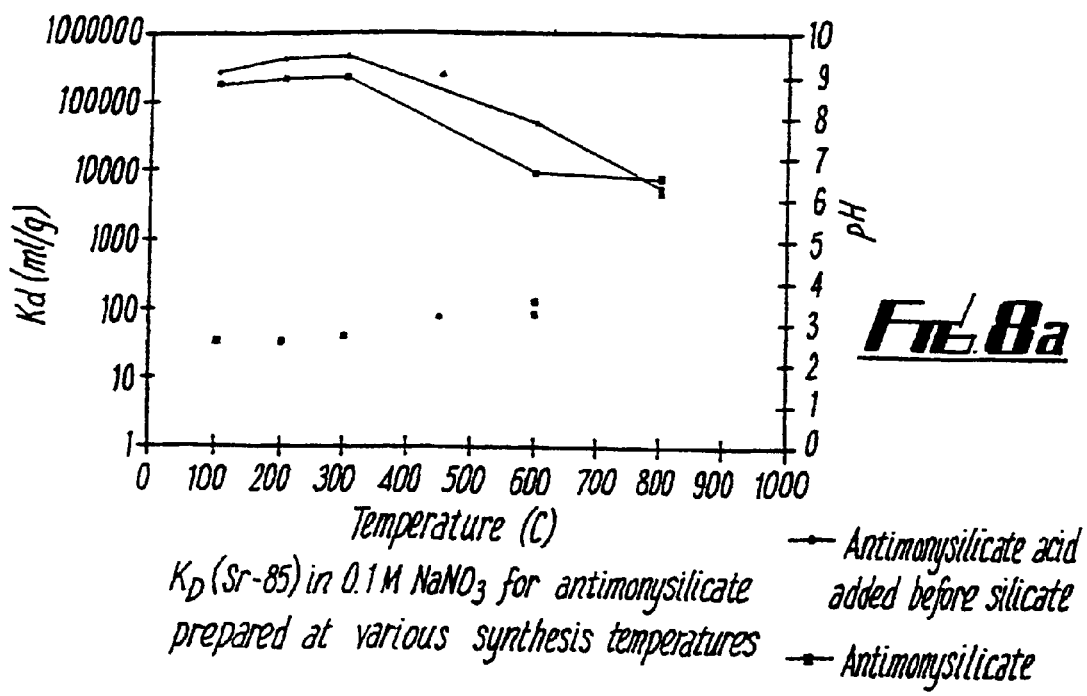
FIG. 8a is a plot showing the effect of $K_D$(Sr-85) in 0.1 M $NaNO_3$ for antimony silicate prepared at various synthesis temperatures of the present invention.
Figure 8B:
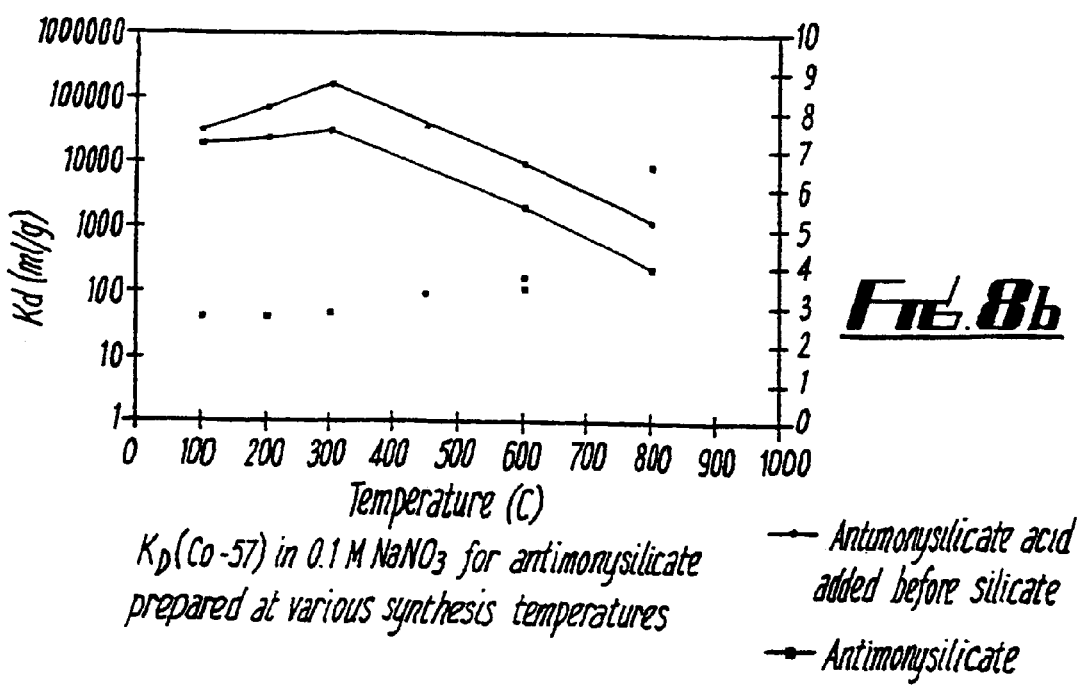
FIG. 8b is a plot showing the effect of $K_D$(Co-57) in 0.1 M $NaNO_3$ for antimony silicate prepared at various synthesis temperatures of the present invention.
Figure 9A:
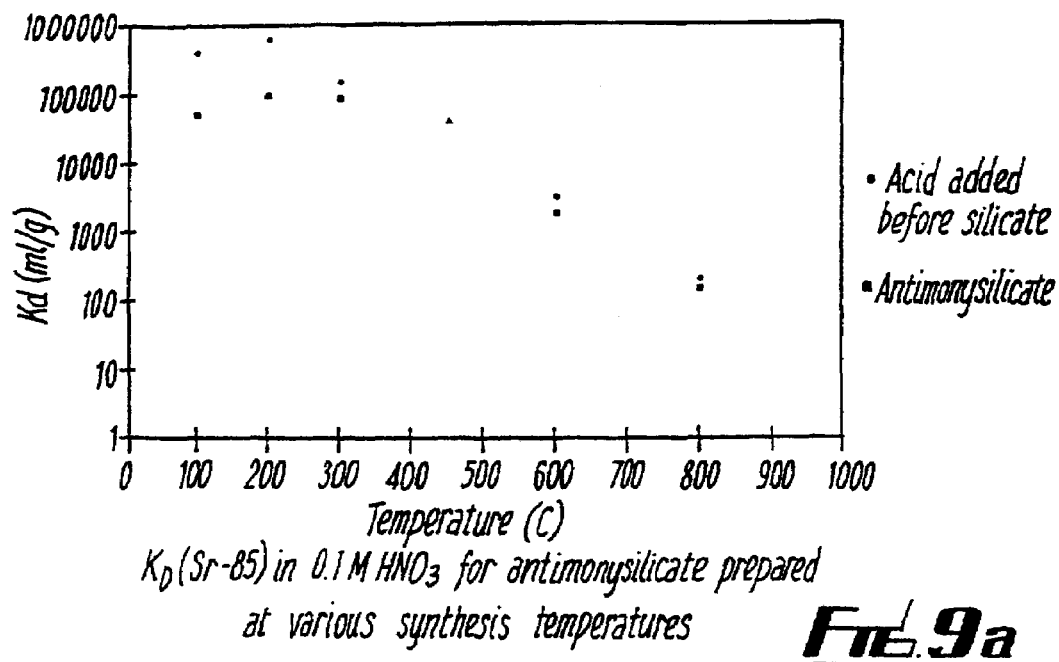
FIG. 9a is a plot of $K_D$(Sr-85) in 0.1 M $HNO_3$ for antimony silicate prepared at various synthesis temperatures of the present invention.
Figure 9B:
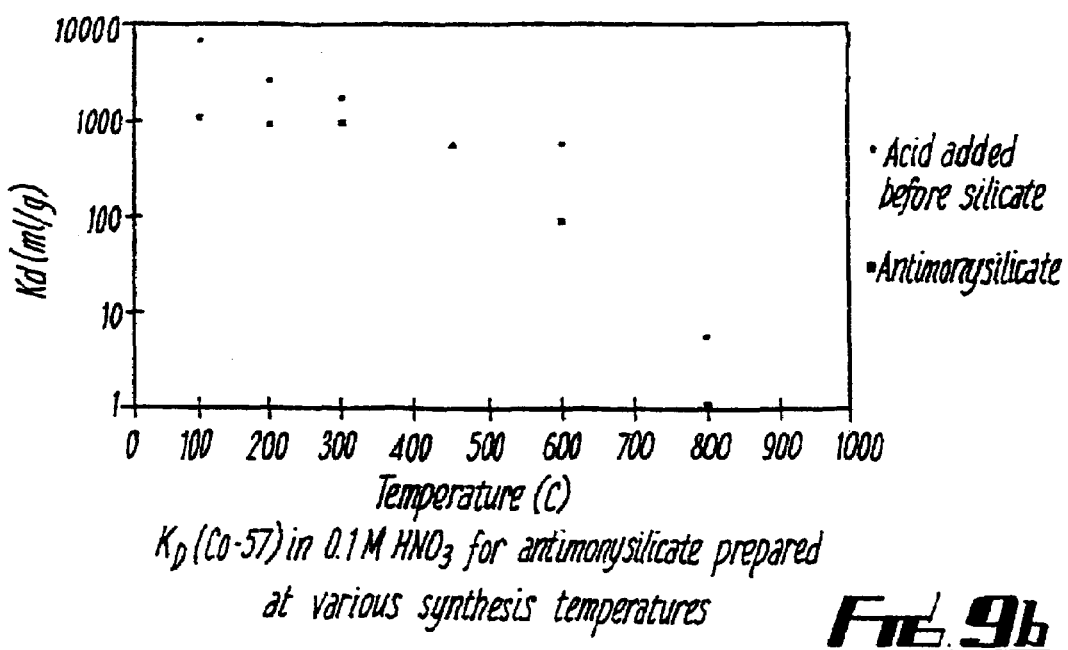
FIG. 9b is a plot showing $K_D$(Co-57) in 0.1 M $HNO_3$ for antimony silicate prepared at various synthesis temperatures of the present invention.

FIGS. 8a and 8b shows how the distribution coefficient, Kd, value for $^{85}$Sr varies according to the drying temperature used.

The compounds may be reacted together by mixing them. The mixing time may vary, for example from about an hour to several days. Preferably the mixing time is from one to eight hours. The mixing time may however be much shorter or much longer than the time given as an example.

The polymerisation conditions may be provided by the presence of a suitable polymerisation catalyst such as, for example, an acid. The acid may be, for example, $HNO_3$, HCl or $H_2SO_4$. The acid may be added to the antimony containing compound before the silicon containing compounds is added or after.

The reaction product may be filtered and/or washed with water at one or more stages before or during the drying.

According to a fourth aspect of the present invention there is provided a material comprising antimony silicate doped with one or more elements selected from the group consisting of tungsten, niobium and tantalum.

The material according to the fourth aspect may be referred to hereinafter as the doped material. The one or more elements selected from the group consisting of tungsten, niobium and tantalum may be referred to hereinafter as the dopant species.

According to a fifth aspect of the present invention there is provided a use of a material comprising antimony silicate doped with one or more elements selected from the group consisting of tungsten, niobium and tantalum as a sorbent in the removal of metal ions from a liquid medium.

According to a sixth aspect of the present invention there is provided a method of extracting metal ions from an aqueous solution comprising contacting the aqueous solution with a doped material according to the fourth aspect of the present invention.

The doped material may be doped with only one element from the group consisting of tungsten, niobium and tantalum. The doped material may be doped with two or more elements from the group consisting of tungsten, niobium and tantalum.

Tungsten and/or niobium are the preferred dopant species.

The mole ratio of Sb:Si:dopant may be in the range from about 1:1:0.005 to about 1:1:2, for a case where the Sb:Si ratio is about 1:1. Generally, better results are obtained where the dopant level, Sb:Si:dopant, is from about 1:1:0.01 to about 1:1:0.5. However, the optimum dopant level may not always fall in the forgoing range as other factors such as the Si:Sb ratio, the type of synthesis reagents, drying times and temperatures may affect the optimum dopant level. Also, the optimum dopant level will depend on the type of ion to be removed from solution.

Figure 13:
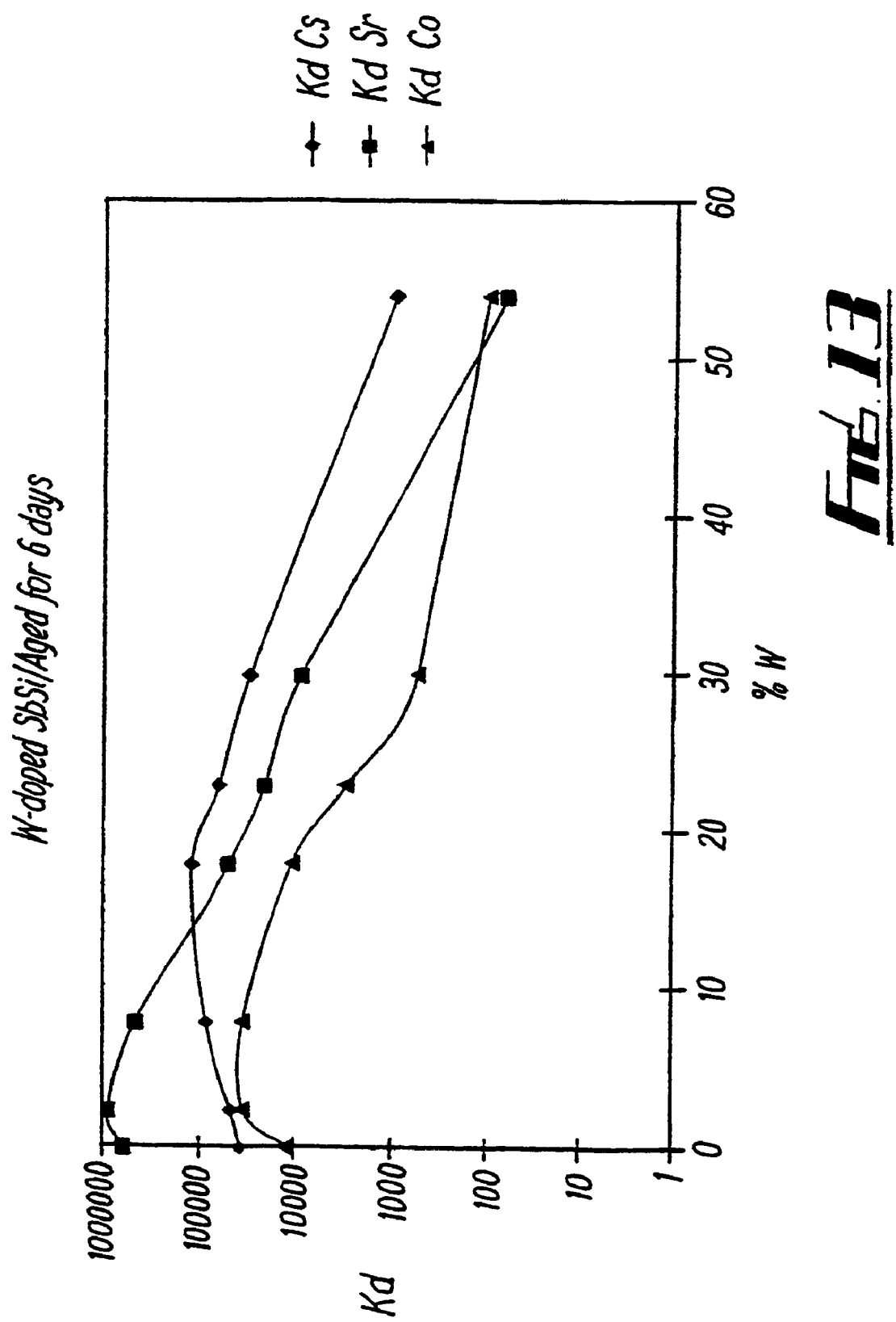
FIG. 13 is a Diot showing W-doped SbSi/Aged for 6 days of the present invention.

Preferably, the weight % concentration of the dopant in the material should be in the range from about 0.5 to about 30.0 weight %. The precise optimum dopant level will depend, inter alia, on the ion to be removed from solution. Some optimum tungsten dopant levels for various ions are shown in FIG. 13.

The doped material may be crystalline or amorphous in structure. A crystalline structure is preferred. The XRD pattern of the crystalline structure preferably is substantially similar to the XRD pattern of crystalline antimony silicate.

It has also been found that doping an antimony silicate with one or more elements selected from the group consisting of tungsten, niobium and tantalum changes the selectivity for different ions. Thus, selective doping with the aforementioned dopants may be controlled in a way so as to make antimony silicate more selective towards particular metal ions. For example, it has been found that doping with W can lead to greater selectivity for caesium ions.

According to a seventh aspect of the present invention there is provided a method of preparation of a material comprising antimony silicate doped with one or more elements selected from the group consisting of tungsten, niobium and tantalum, the method comprising reacting together in a liquid medium a silicon containing compound, an antimony containing compound and a compound containing the one or more elements under polymerisation conditions.

The method according to the seventh aspect of the invention includes the features and options of the method according to the second aspect of the invention for preparing an antimony silicate where applicable.

The fourth, fifth, sixth and seventh aspects of the present invention include the options and features of the first, second and third aspects where applicable.

Specific embodiments of the present invention will now be described by way of the following examples. The examples are illustrative only and do not limit the invention in any way.

EXAMPLES (1) Basic Preparation

Antimony silicates were prepared by the following two methods.

Method A 5.269 g of $KSb(OH)_6$ was dissolved in 360 ml distilled $H_2O$ and this was then added under stirring to 4.17 g of TEOS dissolved in ethanol. 2.75 ml concentrated $HNO_3$ was then added as polymerisation catalyst, and the mixture stirred for 1 hour at 77° C. The product was washed with distilled water and dried. The dried product was then heated to form the desired material. The materials were found to be amorphous under XRD analysis (see FIG. 1). Table 1 shows the Kd values for various ions for a sample which was heated to 450° C.

Method B $SbCl_5$ was mixed with sodium silicate, $Na_2Si_3O_7$, in the presence of 4M HCl with the pH maintained at about 1. This formed a gel-like product after being left at 60° C. overnight. The product was filtered and washed and dried and the XRD trace showed that the material was crystalline.

The results described below were obtained using the material prepared by method A above.

(2) Effect of pH and co-present Metal Ions

Figure 3:
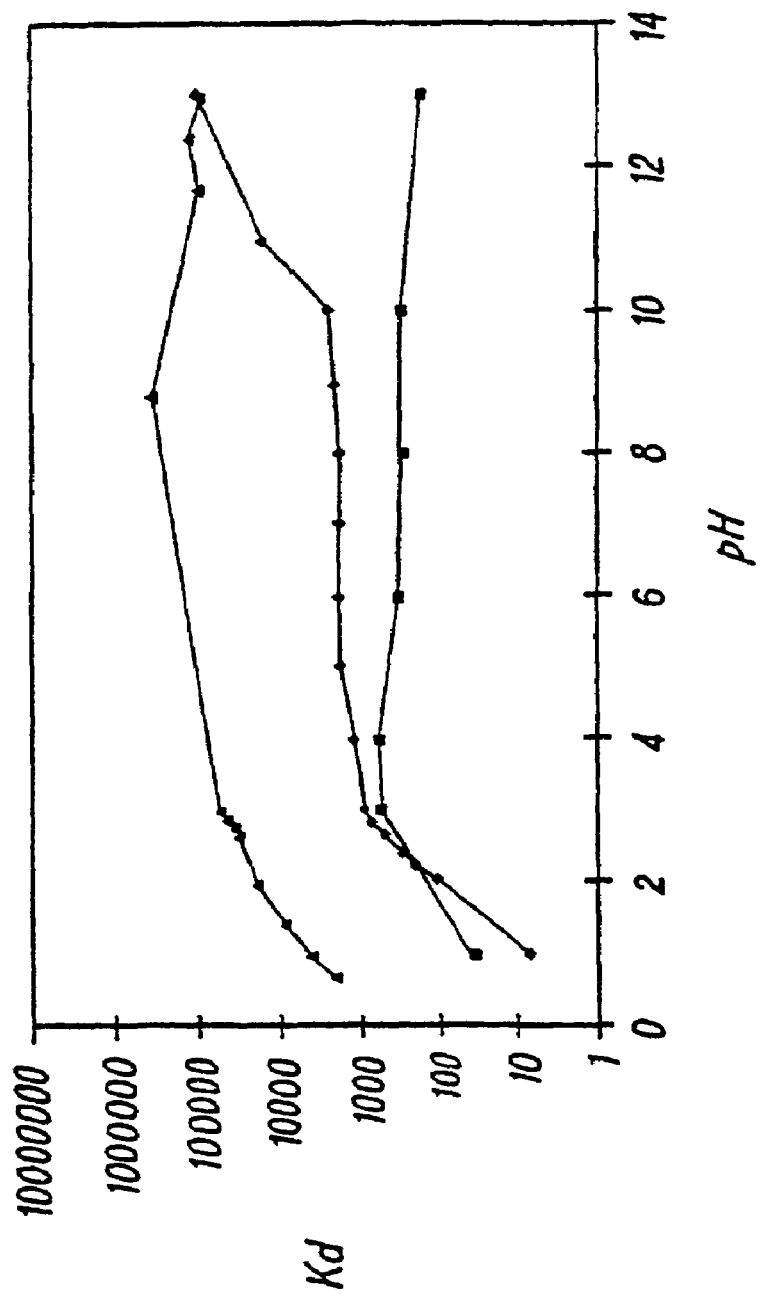
FIG. 3 is a plot of a comparison of various materials of $K_d$ for Sr-85 of the present invention.

FIGS. 2 and 3 shows how the $K_d$ value for $^{85}Sr$ varies as a function of pH in 0.1M $NaNO_3$ for the antimony silicate prepared at 450° C. as above, commercial CST and clinoptilolite and the commercially available SrTreat material. The Kd values for the antimony silicate are almost constant between pH3-13 and Kd is still above 1000 ml/g at pH 1 which is far superior to the commercial SrTreat and CST and clinoptilolite.

Figure 4:
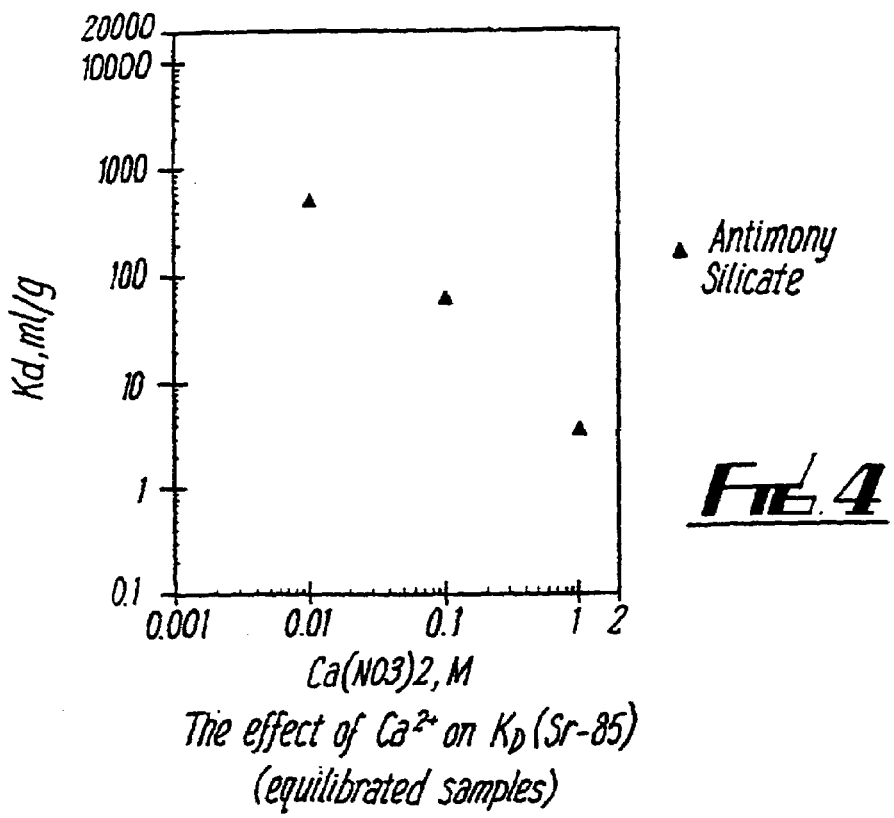
FIG. 4 is a plot showing the effect of $Ca^{2+}$ on $K_D$(Sr-85) of the present invention.

FIG. 4 shows how the $K_d$ values are affected by the presence of calcium ions.

Figure 5:
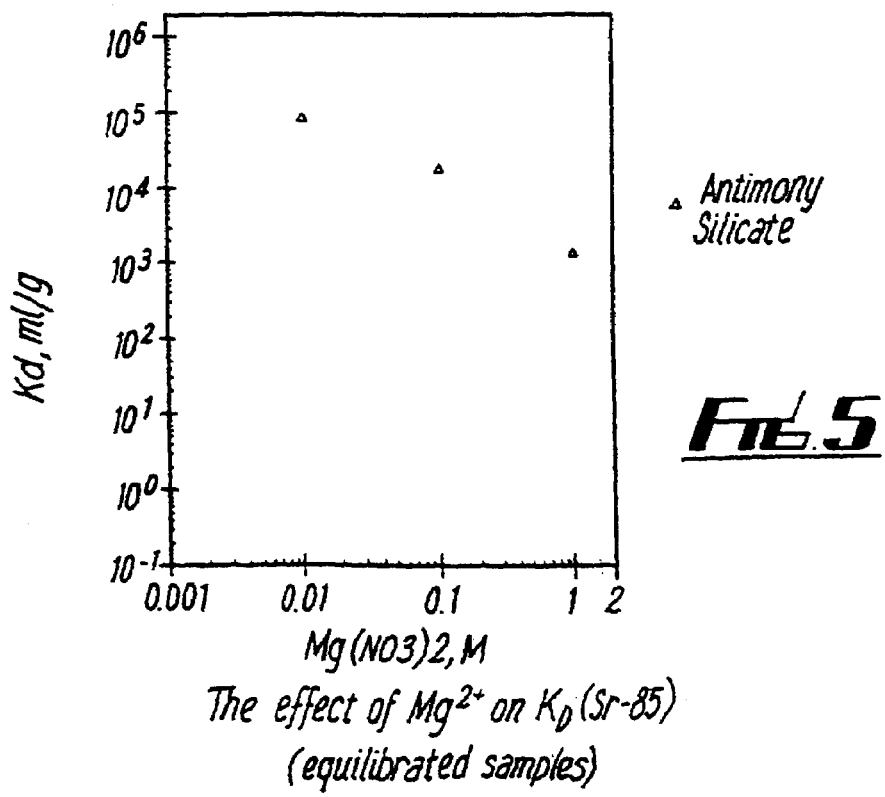
FIG. 5 plot showing the effect of $Mg^{2+}$ on $K_D$(Sr-85) of the present invention.

FIG. 5 shows how the $K_d$ values are affected by the presence of $Mg^{2+}$ ions.

Figure 6A:
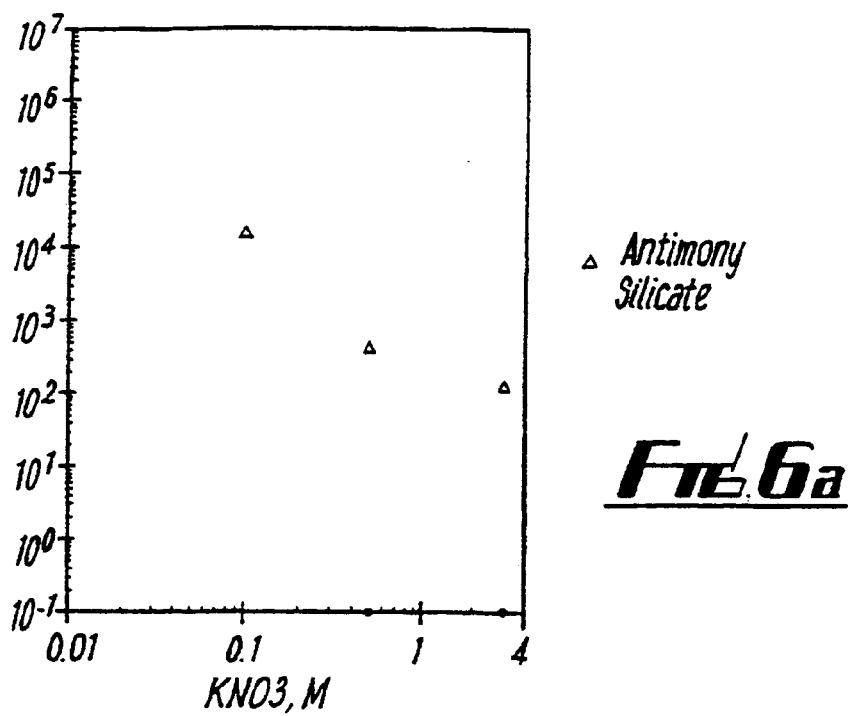
FIG. 6a is a plot showing the effect of $K^+$ on $K_D$(Sr-85) of the invention invention.
Figure 6B:
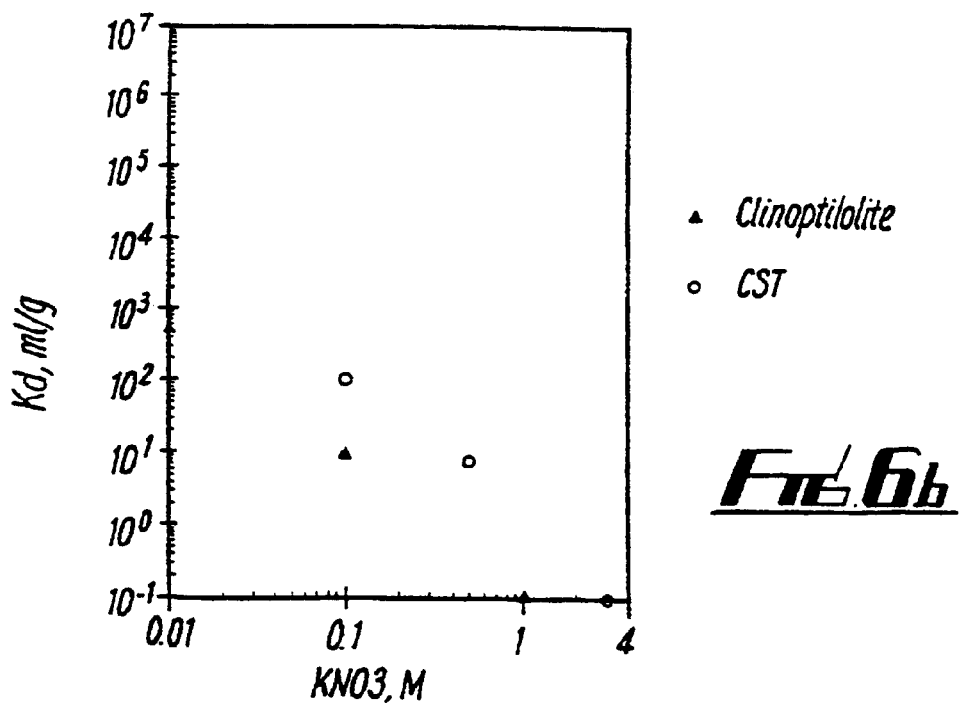
FIG. 6b is a plot showing the effect of $K^+$ on $K_D$(Sr-85) of the present invention.

FIGS. 6a and 6b shows how the $K_d$ values are affected by the presence of $Mg^{2+}$ ions.

FIGS. 7a and 7b shows how the $K_d$ values are affected by the presence of $Na_+$ ions.

(3) Effect of Synthesis Temperature

Different antimony silicate samples were then prepared by heating the product to various temperatures. Samples were prepared by heating to 100 °C., 200 °C., 300° C., 450° C., 600° C. and 800° C. FIGS. 8a and 8b and 9a and 9b shows how $K_d$ for $^{85}Sr$ and $^{57}Co$ varies with the synthesis temperature. A slight maximum is seen at about 300 ° C. Separate results are given for the case when acid is added in the synthesis before the silicate (see below).

(4) Effect of Adding Acid before Silicate

Samples were prepared as above with various synthesis temperatures except that some $HNO_3$ was added before TEOS to hasten the solubility of the $KSb(OH)_6$. The comparison of the Kd values with and without prior addition of $HNO_3$ are shown in FIGS. 8a and 8b and 9a and 9b The material prepared where the acid was added before the silicate was slightly better at removing $^{85}Sr$ and $^{57}Co$.

(5) Effect of Sb:Si ratio

Figure 10A:
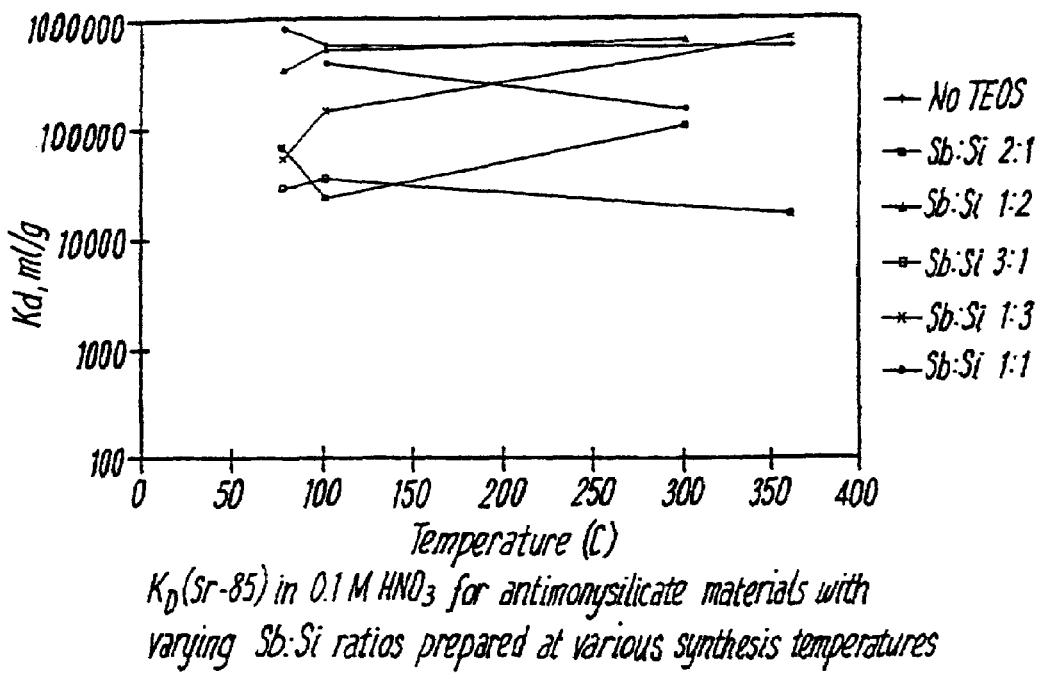
FIG. 10a is a plot showing $K_D$(Sr-85) in 0.1 M $HNO_3$ for antimony silicate materials with varying Sb:Si ratios prepared at various synthesis temperatures of the present invention.
Figure 10B:
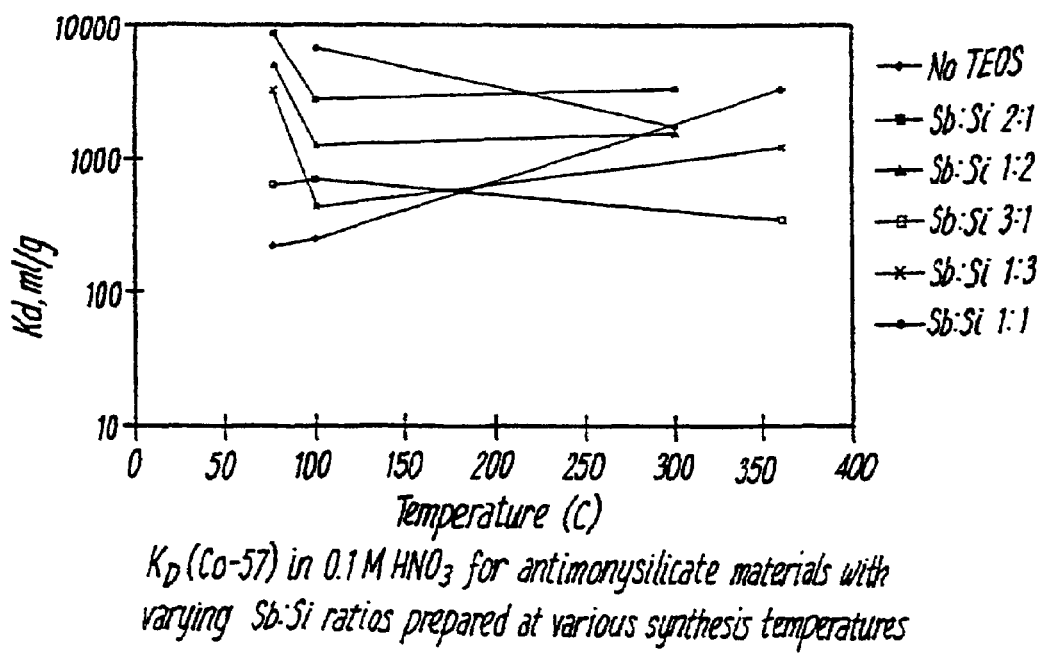
FIG. 10b is a plot showing $K_D$(Co-57) in 0.1 M $HNO_3$ for antimony silicate materials with varying Sb:Si ratios prepared at various synthesis temperatures of the present invention.

Synthese were also carried out in which the Sb:Si ratio was varied. The Sb:Si ratios used were 1:1, 2:1, 3:1, 1:2 and 1:3. Also a synthesis was carried out without any silicate to produce antimonic acid. The synthesis temperatures were about 100 ° C. and 300° C. The $K_d$ values for $^{85}Sr$ in 0.1M $HNO_3$ are shown in FIG. 10a . The $K_D$values for $^{57}Co$ in 0.1M $HNO_3$ are shown in FIG. 10b.

Antimonic acid and the Sb:Si=1:2 showed the best performance. When the amount of Sb is increased the $K_d$ values for $^{85}Sr$ tend to fall. The ratio of Sb:Si giving the best performance for Sr removal was found to be 1:1 to 2:1.

(6) Preparation of Tungsten Doped Antimony Silicate

Method A $Na_2WO_4*2H_2O$ was mixed with $KSb(OH)_6$ and TEOS at acidic pH in Sb:Si:W mole ratios of 1:1:0.5, 1:1:1, 1:1:2 and 1:1:0.1. The mixtures were kept in a 77° C. oven overnight and a gel-like product was filtered and dried at room temperature. The materials so obtained were amorphous when analysed by XRD.

Method B

A crystalline tungsten doped material was obtained by adding 6.10 g $SbCl_5$ in 100 ml 4M HCl to a solution of 4.46 g sodium silicate ("water glass") in 100 ml water simultaneously with a solution of 3.30 g $Na_2WO_4*2H_2O$ in 100 ml water. Additional 200 ml of water was quickly added. Several different Sb:Si:W ratios were used and the heating time at 77° C. was varied. The XRD patterns were characteristic of crystalline antimony silicate.

(7) $K_d$ Values for Tungsten Doped Antimony Silicates

Table 4 shows $K_d$ values for removal of Cs, Sr and Co in 0.1M $HNO_3$ using tungsten doped antimony silicates prepared by both methods A and B above.

For Sr, the $K_d$ values show little improvement over the undoped antimony silicate material, except at very low W levels, eg. Sb:Si:W=1:1:0.1.

For Cs removal on the other hand, the $K_d$ values tend to increase with increasing W concentration before decreasing at higher W concentrations. The W doped materials are generally more selective towards Cs than the undoped material.

Figure 11A:
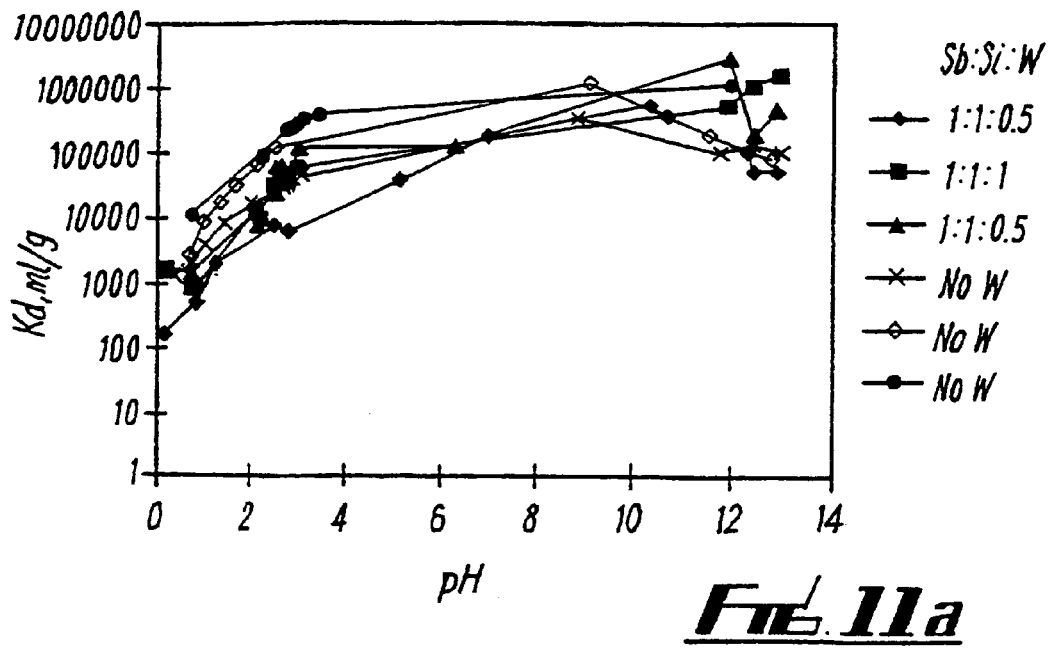
FIG. 11a is a plot showing $K_D$(Sr-85) as a function of pH in 0:1 M NaNO3 of the present invention.
Figure 11B:
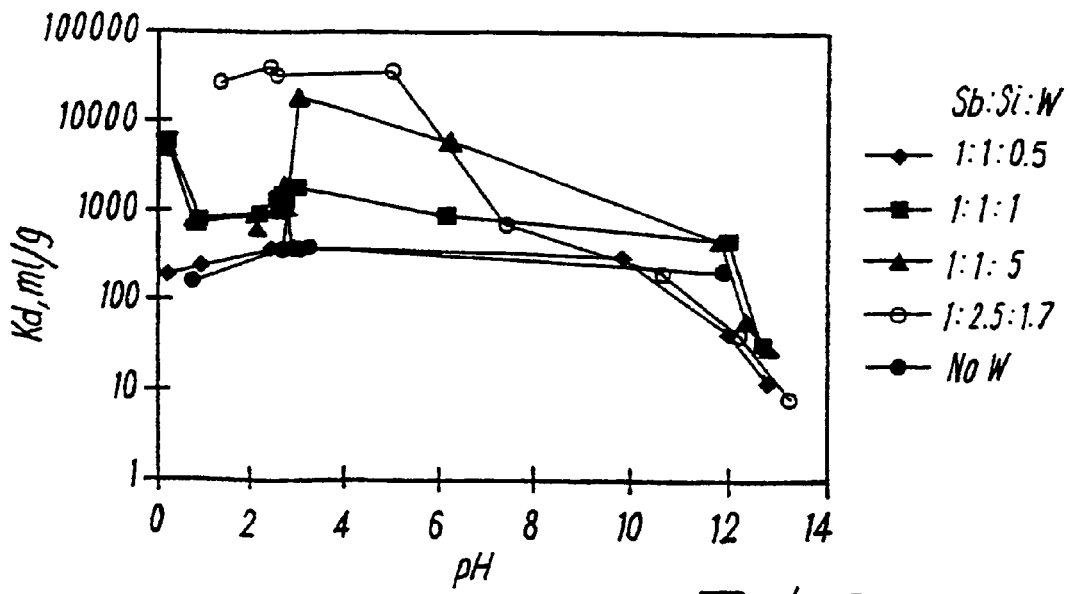
FIG. 11b is a plot showing $K_D$(Cs-134) as a function of pH in 0.1 M NaNO3 of the present invention.
Figure 11C:
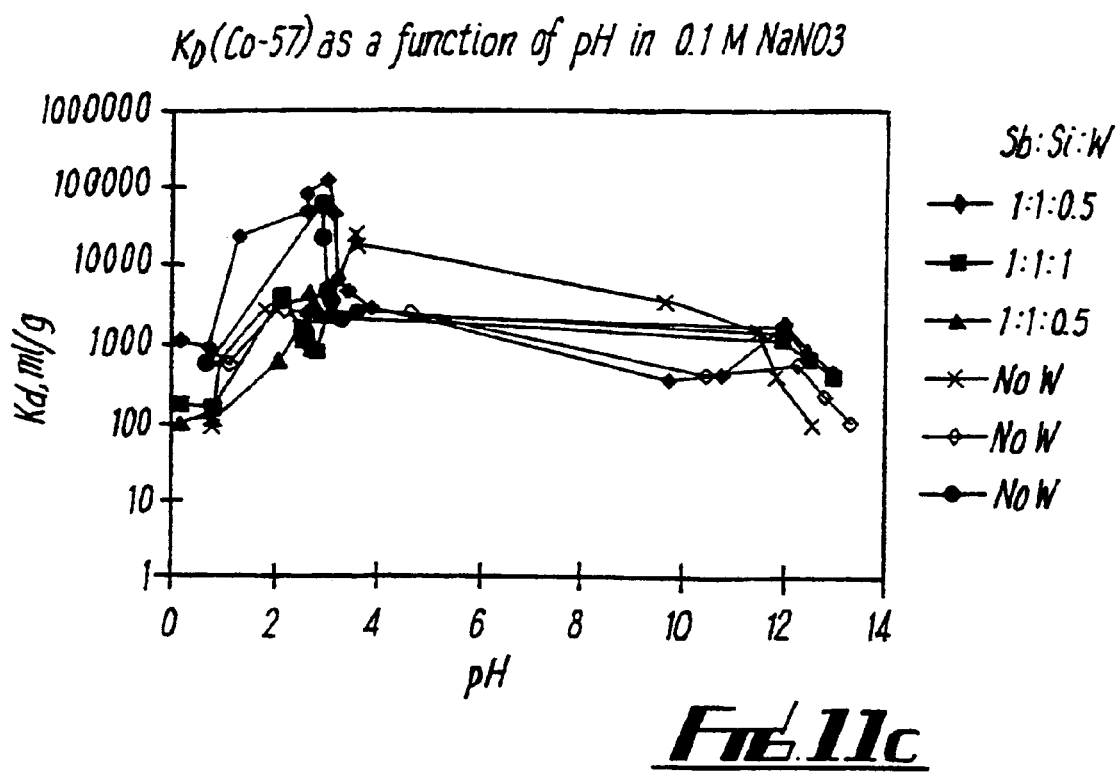
FIG. 11c is a plot showing $K_D$(Co-57) as a function of pH in 0.1 M NaNO3 of the present invention.

FIGS. 11a, b, c show how the $K_d$ values change as a function of pH in $0.1NaNO_3$.

Figure 12:
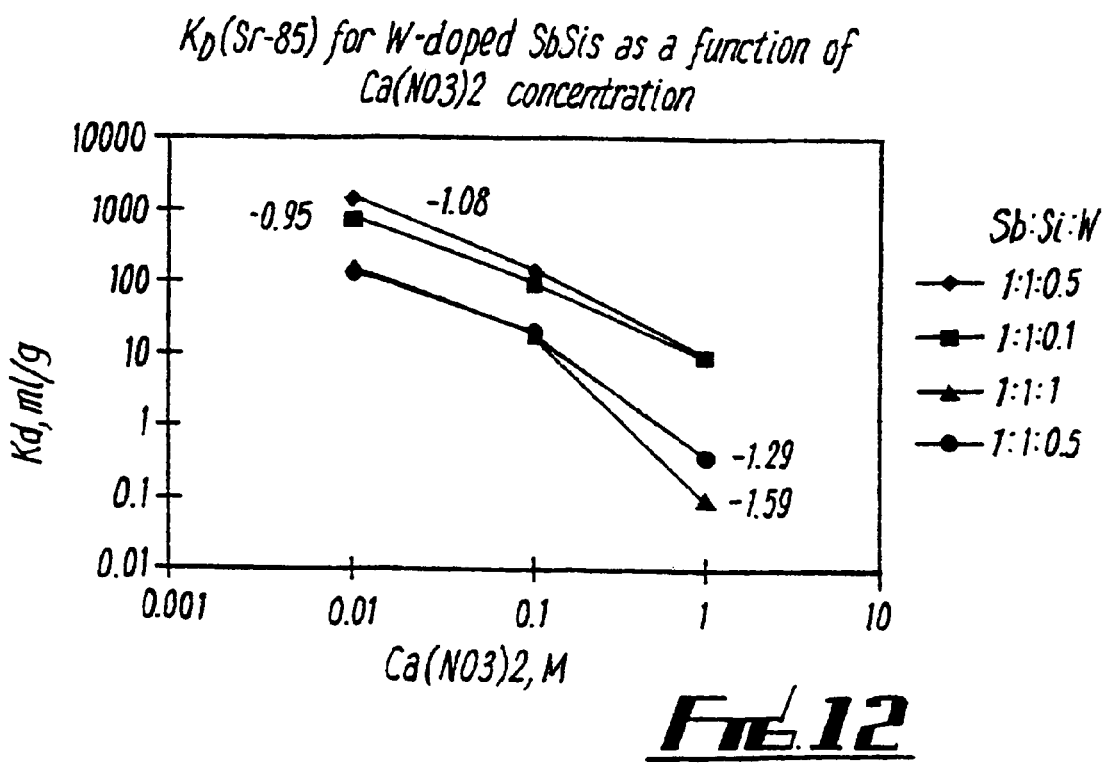
FIG. 12 is a Diot showing $K_D$(Sr-85)for W-doped SbSis as a function of Ca(N03)2 concentration of the present invention.

FIG. 12 shows how the $K_d$ value for Sr changes as a function $Ca(NO_3)_2$ concentration.

FIG. 13 shows how the $K_d$ values for Cs, Sr and Co change as a function of the weight % loading of tungsten in the material.

(8) Niobium Doped Antimony Silicates

To produce a Si:Sb:Nb=1:1:0.48 material, 0.892 g sodium silicate solution (27% $SiO_2$, 14% NaOH) was diluted to 80 ml with distilled water. This was quickly added to a stirred solution of 1.22 g $SbCl_5$ and 0.53 g $NbCl_5$ in 4M HCl (20 ml). The resulting clear colourless solution was left overnight at ambient temperature, 348K or 473K. The products were isolated by centrifugation, washed with distilled water and air dried at 348K. Further samples with different Si:Sb:Nb ratios were made.

(9) $K_d$ Values for Niobium Doped Antimony Silicates

Table 5 shows $K_d$ values for Cs, Sr and Co in 0.1 M $HNO_3$ for niobium doped antimony silicates prepared at different mole ratios and temperatures.

For Cs ions, peaks in the $K_d$ values occur when the Nb:Sb ratio is in the range 0.01 to 0.05 when a synthesis temperature of 298 K is used. When a synthesis temperature of 473 K is used, however, the peak $K_d$ occurs around a Nb:Sb ratio of about 1:1.

For Sr ions maximum $K_d$ values are generally seen for low concentrations of Nb.

TABLE 1

Distribution coefficients ($K_D$) for Antimonysilicate

| NUCLIDE | 4 M $HNO_3$ | 0.1 M $HNO_3$ | 0.1 M $NaNO_3$ | 0.1 M $NaNO_3$/ 0.1 M NaOH | Dist. $H_2O$ |
|---|---|---|---|---|---|
| Cs-134 | 32.8 | 590 | 280 | 26.0 | 2517 |
| Sr-85 | 68.0 | 19660 | 44305 | 56070 | 13480 |
| Co-57 | — | 1959 | 33807 | 6177 | 273 |
| Am-241 | 3.43 | 134856 | 245071 | 120482 | 979 |
| Zn-65 | 2.92 | 4604 | 39853 | 25827 | 962 |
| Fe-59 | — | 14292 | 6442 | — | 114 |
| Mn-54 | — | 569 | 2545 | 3330 | 972 |
| Pu-236 | 17024 | 14067 | 8752 | 417 | 85.7 |

— Not measured

TABLE 2

Distribution coefficients ($K_D$) for CST

| NUCLIDE | 4 M $HNO_3$ | 0.1 M $HNO_3$ | 0.1 M $NaNO_3$ | 0.1 M $NaNO_3$/ 0.1 M NaOH | Dist. $H_2O$ |
|---|---|---|---|---|---|
| Cs-134 | 1327 | 51460 | 97500 | 10710 | 177800 |
| Sr-85 | 0.60 | 9.6 | 1091 | 465500 | 18910 |
| Co-57 | 0.57 | 0.18 | 334 | 1155 | 26220 |
| Pu-236 | 12.1 | 285 | 31950 | 9157 | 789 |
| Am-241 | 4.35 | 95.3 | 18822 ! | 8577 | 59388 ! |

TABLE 3

Distribution coefficients ($K_D$) for clinoptilolite

| NUCLIDE | 4 M $HNO_3$ | 0.1 M $HNO_3$ | 0.1 M $NaNO_3$ | 0.1 M $NaNO_3$/ 0.1 M NaOH | Dist. $H_2O$ |
|---|---|---|---|---|---|
| Cs-134 | 43.0 | 2524 | 1844 | 594 | 72010 |
| Sr-85 | 0.5 | 34.0 | 422 | 354 | 146360 |
| Co-57 | 1.23 | 4.05 | 5777 | 1310 | 14360 |
| Pu-236 | 0 | 1021 | 2517 | 26700 | 1147 |
| Am-241 | 0 ! | 3.78 | 10435 | 48874 ! | 1365 |

TABLE 4

| Sample name | Starting materials | Sb:Si:W ratio (%) (weight %) | Sb:Si:W mole ratio | XRD trace | $K_D$(Cs-134), [ml/g] In 0.1 M $HNO_3$ Kd/Kd aged 6 days | $K_D$(Sr-85), [ml/g] In 0.1 M $HNO_3$ Kd/Kd aged 6 days | $K_D$(Co-57), [ml/g] In 0.1 M $HNO_3$ Kd/Kd aged 6 days |
|---|---|---|---|---|---|---|---|
| 1 | $SbCl_3$ In 4 M HCl, Crystal 0503, $Na_2WO_4*2H_2O$ | 59:11:0 | 1:~1:0 | Cryst. SbSi | 12404/36307 | 584512/605345 | 1995/12045 |
| 2 | $SbCl_3$ In 4 M HCl, Crystal 0503, $Na_2WO_4*2H_2O$ | 56:11:2.4 | 1:~1:0.03 | Cryst. SbSi | 18085/44951 | 554420/884736 | 3453/33704 |
| 3 | $SbCl_3$ In 4 M HCl, Crystal 0503, $Na_2WO_4*2H_2O$ | 53:11:8 | 1:~1:0.1 | Cryst. SbSi | 35714/86392 | 230668/459068 | 2263/33786 |
| 4 | $SbCl_3$ In 4 M HCl, Crystal 0503, $Na_2WO_4*2H_2O$ | 46:10:18 | 1:~1:0.3 | Cryst. SbSi | 36472/126010 | 28612/49965 | 1874/10841 |
| 5 | $SbCl_3$ In 4 M HCl, Crystal 0503, $Na_2WO_4*2H_2O$ | 42:9.4:23 | 1:~1:0.5 | Semicryst. SbSi | 16797/63573 | 16644/20876 | 512/3033 |
| 6 | $SbCl_3$ In 4 M HCl, Crystal 0503, $Na_2WO_4*2H_2O$ | 38:8.6:30 | 1:~1:1 | Amorphous | 14602/30172 | 8956/8802 | 379/581 |
| 7 | $SbCl_3$ In 4 M HCl, Crystal 0503, $Na_2WO_4*2H_2O$ | 16:5:54 | 1:~1:3 | Amorphous | 940/1039 | 71/69 | 19/108 |
| 9 | $SbCl_3$ In 4 M HCl, Crystal 0503, $Na_2WO_4*2H_2O$ | 0:8:71 | 0:~1:1 | Tungstite $WO_3*xH_2O$ | 9244/77381 | 23/61 | 4.5/87 |
| 10 | $SbCl_3$ In 4 M HCl, Crystal 0503, $Na_2WO_4*2H_2O$ | 52:3.5:25 | 3:~1:1 | Semicryst. SbSi | 9812/55016 | 5860/13642 | 179/1225 |
| 11 | $SbCl_3$ In 4 M HCl, Crystal 0503, $Na_2WO_4*2H_2O$ | —(1:0:1) | 1:0:1 | Amorphous | 3432/— | 1108/— | 154/— |

TABLE 4-continued

| Sample name | Starting materials | Sb:Si:W ratio (%) (weight %) | Sb:Si:W mole ratio | XRD trace | $K_D$(Cs-134), [ml/g] In 0.1 M $HNO_3$ Kd/Kd aged 6 days | $K_D$(Sr-85), [ml/g] In 0.1 M $HNO_3$ Kd/Kd aged 6 days | $K_D$(Co-57), [ml/g] In 0.1 M $HNO_3$ Kd/Kd aged 6 days |
|---|---|---|---|---|---|---|---|
| 12 | $SbCl_3$ In 4 M HCl, Crystal 0503, $Na_2WO_4 \cdot 2H_2O$ | 27:21:16 | | Cryst. SbSi | 20388/45026 | 23728/3706 | 719/533 |

TABLE 5

Distribution coefficients (L/Kg) of Cs-137, Sr-90 and Co-57 in 0.1 mol/L $HNO_3$ on niobium-doped antimony silicates prepared at different temperatures (V:m = 200)

| Temp (K) | Starting Si:Sb:Nb | Cs-137 | Sr-90 | Co-57 |
|---|---|---|---|---|
| 298 | 1:1:0.012 | 87633 | 323369 | 12042 |
| | 1:1:0.026 | 97476 | 236791 | 11397 |
| | 1:1:0.093 | 71503 | 177655 | 6724 |
| | 1:1:0.0263 | 11014 | 74176 | 817 |
| | 1:1:0.48 | 989 | 745 | 38 |
| | 1:1:0.98 | 374 | 37 | 2 |
| | 0.5:1:0.01 | 54708 | 627533 | 21153 |
| 348 | 1:1:0.012 | 22406 | 160147 | 1477 |
| | 1:1:0.026 | 25771 | 144125 | 1748 |
| | 1:1:0.093 | 26606 | 303250 | 2176 |
| | 1:1:0.0263 | 24990 | 108549 | 864 |
| | 1:1:0.48 | 9636 | 70236 | 177 |
| | 1:1:0.98 | 637 | 539 | 17 |
| | 0.5:1:0.01 | 24556 | 620052 | 3240 |
| 473 | 1:1:0.012 | 5349 | 43503 | 2367 |
| | 1:1:0.026 | 6249 | 14761 | 1542 |
| | 1:1:0.093 | 3619 | 15683 | 4588 |
| | 1:1:0.0263 | 13155 | 27277 | 17068 |
| | 1:1:0.48 | 14688 | 7988 | 5031 |
| | 1:1:0.98 | 118552 | 4354 | 403 |
| | 0.5:1:0.01 | 17550 | 14451 | 2772 |

We claim:

1. A method of extracting metal ions from an aqueous solution comprising contacting the aqueous solution with a material consisting essentially of antimony silicate doped with one or more elements selected from the group consisting of tungsten, niobium and tantalum which material has been obtained by reacting together in a liquid medium a silicon-containing compound, an antimony containing compound and a compound containing one or more of the elements in the presence of an acid.

2. A method according to claim 1 wherein the material has a Si:Sb ratio of less than 5.

3. A method according to claim 1 wherein the one or more elements is present in the material at a concentration in the range from about 0.5 to about 30.0 weight %.

4. A method according to claim 2 wherein the one or more elements is present in the material at a concentration in the range from about 0.5 to about 30.0 weight %.

5. A method according to claim 1 in which the aqueous solution has a pH <7.

6. A method according to claim 1 in which the metal ions are radioactive metal ions.

7. A method according to claim 6 in which the radioactive metal ions comprise Sr, Cs, Co, Pu or Am ions.

8. The process of claim 1 wherein the acid is a polymerization catalyst.

9. The method of claim 1 wherein the material is a crystalline antimony silicate material.

10. The method of claim 6 in which the aqueous solution is acidic and contains at least one background ions Na, K, Mg or Ca ions at a higher concentration than the concentration of the radioactive metal ions.

11. The method of claim 6 in which the aqueous solution is acidic and contains at least one background ion Na, K, Mg, or Ca ions, and in which the radioactive metal ions are selectively removed from the aqueous solution, the background ions being left behind in the aqueous solution.

12. A method of extracting metal ions from an aqueous solution comprising contacting the aqueous solution with a material consisting essentially of antimony silicate doped with one or more elements selected from the group consisting of tungsten, niobium and tantalum.

* * * * *

UNITED STATES PATENT AND TRADEMARK OFFICE
CERTIFICATE OF CORRECTION

PATENT NO. : 7,332,089 B2  Page 1 of 1
APPLICATION NO. : 10/675138
DATED : February 19, 2008
INVENTOR(S) : Risto Olavi Harjula et al.

It is certified that error appears in the above-identified patent and that said Letters Patent is hereby corrected as shown below:

On the Cover Page:

(75) Inventors: After "Tusa" delete "Kauiainen", insert --Kauniainen--

In the Specification:

Col. 1, Line 57  After "the" delete "invention", insert --present--
Col. 2, Line 24  After "is a" delete "Diot", insert --plot--
Col. 2, Line 27  After "is a" delete "Diot", insert --plot--
Col. 5, Line 35  After "Method A" (new paragraph) delete "5.269", insert --5.26--
Col. 6, Line 2  After "presence of" delete "Na $_+$", insert --Na $^+$--
Col. 7, Table 4  After each "Sample name number" delete "SbCl $_3$", insert --SbCl $_5$-- (11 occurrences in Table 4)
Col. 7, Table 4 - After "Sample Name 9 Col. 5" delete "9244/77381", insert --9244/77581--

Signed and Sealed this

Third Day of February, 2009

JOHN DOLL
*Acting Director of the United States Patent and Trademark Office*